United States Patent
Hisatake

(10) Patent No.: US 7,423,715 B2
(45) Date of Patent: Sep. 9, 2008

(54) LIQUID CRYSTAL DISPLAY DEVICE WITH RETARDATION LAYER

(75) Inventor: Yuzo Hisatake, Yokohama (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 69 days.

(21) Appl. No.: 10/920,354

(22) Filed: Aug. 18, 2004

(65) Prior Publication Data

US 2005/0275780 A1    Dec. 15, 2005

(30) Foreign Application Priority Data

Aug. 20, 2003  (JP) .............................. 2003-296003

(51) Int. Cl.
*G02F 1/1335* (2006.01)

(52) U.S. Cl. ........................ 349/119; 349/117; 349/118; 349/120; 349/121

(58) Field of Classification Search ................. 349/117, 349/119–121, 105, 98–102, 118
See application file for complete search history.

(56) References Cited

U.S. PATENT DOCUMENTS

| | | | |
|---|---|---|---|
| 6,081,312 A * | 6/2000 | Aminaka et al. ............. | 349/118 |
| 6,226,065 B1 * | 5/2001 | Abileah et al. ............. | 349/120 |
| 6,335,776 B1 * | 1/2002 | Kim et al. ............. | 349/129 |
| 6,411,355 B1 * | 6/2002 | Manabe et al. ............. | 349/120 |
| 6,512,561 B1 * | 1/2003 | Terashita et al. ............. | 349/118 |
| 6,593,984 B2 * | 7/2003 | Arakawa et al. ............. | 349/117 |
| 6,853,424 B2 * | 2/2005 | Elman et al. ............. | 349/117 |
| 6,912,030 B1 * | 6/2005 | Coates et al. ............. | 349/119 |
| 6,922,222 B2 * | 7/2005 | Miyachi et al. ............. | 349/118 |
| 7,218,367 B2 * | 5/2007 | Umeda et al. ............. | 349/119 |
| 2002/0041352 A1 * | 4/2002 | Kuzuhara et al. ............. | 349/117 |
| 2002/0089629 A1 * | 7/2002 | Kim et al. ............. | 349/117 |

FOREIGN PATENT DOCUMENTS

| | | | |
|---|---|---|---|
| JP | 407181325 | * | 7/1995 |
| JP | 2565639 | | 10/1996 |
| JP | 9-197397 | | 7/1997 |
| JP | 11-72777 | | 3/1999 |
| JP | 02002131693 | * | 5/2000 |
| JP | 2002-305855 | * | 4/2002 |
| JP | 2004-4314 | | 1/2004 |

* cited by examiner

*Primary Examiner*—Andrew Schechter
*Assistant Examiner*—Hoan C Nguyen
(74) *Attorney, Agent, or Firm*—Oblon, Spivak, McClelland, Maier & Neustadt, P.C.

(57) ABSTRACT

A liquid crystal display device includes a liquid crystal panel having a structure in which a liquid crystal layer LQ is held between a pair of electrode substrates AR, CT, a pair of polarizers PL which hold the liquid crystal panel therebetween, and a pair of optical retardation plates RT arranged between the liquid crystal panel and the pair of polarizers PL. Each optical retardation plate RT has a refractive anisotropy in which average refractive indices nx, ny, and nz in an x-axis direction, a y-axis direction, and a z-axis direction being perpendicular to each other satisfy nx>ny>nz in a state when the z-axis direction conforms to the normal direction. The x-axis direction of each optical retardation plate RT is almost parallel to the transmission axis of the polarizer PL adjacent to a corresponding optical retardation plates RT.

9 Claims, 12 Drawing Sheets

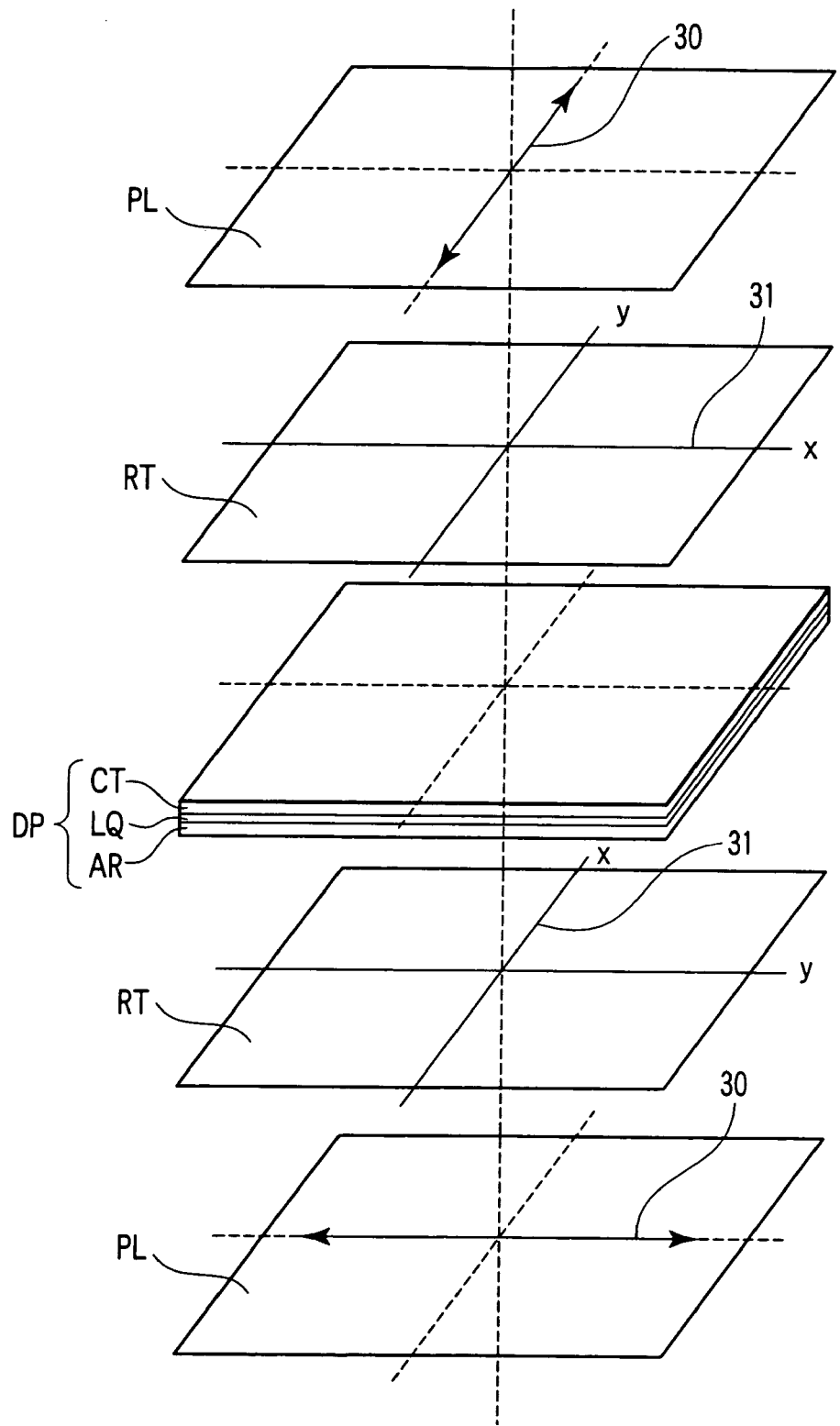
F I G. 9

LIQUID CRYSTAL DISPLAY DEVICE WITH RETARDATION LAYER

CROSS-REFERENCE TO RELATED APPLICATIONS

This application is based upon and claims the benefit of priority from prior Japanese Patent Application No. 2003-296003, filed Aug. 20, 2003, the entire contents of which are incorporated herein by reference.

BACKGROUND OF THE INVENTION

1. Field of the Invention

The present invention relates to a liquid crystal display device having an optical retardation plate attached to a liquid crystal panel in which liquid crystal molecules are aligned substantially vertically to attain a black display.

2. Description of the Related Art

Liquid crystal display devices are applied to various fields of OA equipment, information terminals, watches, televisions and the like because of their features of lightness, thinness, and low power consumption. Particularly, an active matrix liquid crystal display device is a liquid crystal display device which has an excellent response characteristic obtained by using thin film transistors (TFTs) for switching pixels. Thus, the active matrix liquid crystal display device is used as a monitor display for portable TVs or computers to display a large quantity of image information.

In recent years, with an increase in the quantity of information, there has been a demand for enhancement of resolution and display speed of liquid crystal display devices. High resolution is achievable by miniaturizing the TFT array structure and increasing the number of pixels.

On the other hand, consideration has been given to increasing the display speed by replacing a conventional display mode with another one. The other display mode may be selected from optically compensated birefringence (OCB), vertically aligned nematic (VAN), hybrid aligned nematic (HAN), and π-alignment modes using a nematic liquid crystal, and surface-stabilized ferroelectric liquid crystal (SS-FLC) and Anti-Ferroelectric Liquid Crystal (AFLC) modes using a nematic liquid crystal, for example.

Of these display modes, the VAN mode in particular has advantageous features that can obtain a response speed higher than that obtained in a conventional twisted nematic mode and that can adopt vertical alignment treatment to dispense with a rubbing process which may cause defects such as electrostatic destruction. Particular attention has been paid to a multi-domain VAN mode (to be referred to as an MVA mode hereinafter) in which the viewing angle can be easily enlarged.

Such a multi-domain structure is generally obtained by electrode-slits or projections for alignment division (for example, see Japanese Patent No. 2565639). The electrode-slits are located at pixel electrodes on an array substrate and the projections are located at a counter electrode on a counter substrate to control gradient of an electric field applied to a pixel area from the pixel and counter electrodes. In this case, the pixel area of the liquid crystal layer is divided upon application of a voltage into, e.g., four domains in which the alignment directions of liquid crystal molecules make angles of 90°. In this manner, an improvement in symmetry of the viewing-angle characteristic and suppression of an inversion phenomenon are realized. A negative optical retardation plate is used to compensate for the visual or observation angle dependence of a retardation produced in a liquid crystal layer in a black display state where liquid crystal molecules are aligned vertical to the electrode substrate, so that the contrast ratio (CR) to a visual angle is made preferable. When the negative optical retardation plate is a biaxial retardation plate having in-plane retardation which compensates for the visual angle dependence of a polarizer, further an excellent visual-angle-contrast characteristic can be realized.

In the MVA mode, however, visual-angle compensation is not sufficient for all gradations but the (minimum) gradation for a black display. In consequence, the luminance (transmittance) characteristic that the panel presents when observed in an inclined direction differs from that the panel presents when observed in the frontal direction of the panel. When the liquid crystal display device is in the MVA mode in which a pixel area is divided into four domains, for example, a visual-angle-luminance characteristic shown in FIGS. 24 to 26 is obtained under liquid-crystal application voltages for various gradations, where a visual angle of 0° represents the frontal direction of the panel. FIG. 24 shows a visual-angle-luminance characteristic measured by shifting the visual angle right and left from the frontal direction of the panel, FIG. 25 shows a visual-angle-luminance characteristic measured by shifting the visual angle diagonally from the frontal direction of the panel, and FIG. 26 shows a visual-angle-luminance characteristic measured by shifting the visual angle upward and downward from the frontal direction of the panel. In this case, the liquid-crystal application voltage is selected from the range of 0 to 4.7 V and applied to a liquid crystal layer LQ. In FIGS. 24 to 26, the abscissa indicates the visual angle where 0° corresponds to the frontal direction of the panel. The ordinate indicates the luminance of the panel in terms of transmittance. According to the visual-angle-luminance characteristic, a difference in luminance between intermediate gradations decreases when the visual angle is determined to observe the panel in a direction inclined from the frontal direction, and the luminance obtained at the (maximum) gradation for a white display is reduced by the visual angle dependence. This raises the problem that a multicolor image entirely looks brownish-white.

Further, another problem is raised by the influences of projections or electrode-slits for obtaining four domains in the MVA mode and Schlieren alignment created on an alignment boundary between these domains. That is, the luminance of the liquid crystal display device is considerably degraded in comparison with the case in which alignment division is not performed. This problem may be solved by reducing the number of divided domains. However, it is difficult to use this countermeasure because of the following reason. When the number of divided domains is four, the liquid crystal display device has a visual-angle-contrast characteristic as shown in FIG. 30. The visual-angle-contrast characteristic is excellent in having contrast ratios (CR) of 10 or more in all directions.

When the number of divided domains is two, the liquid crystal display device has a visual-angle-contrast characteristic as shown in FIG. 31. The visual-angle-contrast characteristic is equivalent to that of the liquid crystal display device in which the number of divided domains is four. However, the liquid crystal display device has a visual-angle-luminance characteristic as shown in FIGS. 27 to 29. According to these drawings, it is understood that luminance inversion occurs at intermediate gradations. The anisotropies of the retardation at intermediate gradations are compensated for when observed in a direction inclined upward or downward since the liquid crystal molecules have antiparallel alignment of the two domains. In contrast, the anisotropies uniformly affect each other when observed in a direction inclined left or right. More specifically, the luminance inversion occurs because a degree of change in the retardation according to the application voltage varies with the visual angle to the frontal direction of the panel. Therefore, when the number of divided domains is two, the luminance of the liquid crystal display device is improved, but the visual-angle-luminance characteristic of the liquid crystal display device is degraded.

BRIEF SUMMARY OF THE INVENTION

The present invention has been made in consideration of the above problems, and has as its object to provide a liquid crystal display device which can improve the visual-angle-luminance characteristic for intermediate gradations without degrading the visual-angle-contrast characteristic in a liquid crystal display mode in which retardation and rotary polarization of a liquid crystal cell are controlled by an electric field which causes liquid crystal molecules in the liquid crystal cell to be changed between alignment states for a black display and for a white display.

According to a first aspect of the present invention, there is provided a liquid crystal display device which comprises: a liquid crystal cell in which liquid crystal molecules are held between a pair of substrates that produce an electric field corresponding to a voltage applied thereto, set in an alignment substantially vertical to each substrate plane when the voltage is not applied to the substrates, and set in an alignment that directors of the molecules are tilted in a predetermined cross section when the voltage is applied to the substrates; and an optical retardation plate arranged to face the liquid crystal cell; wherein the optical retardation plate includes at least first and second regions stacked in a thickness direction to have negative retardation which presents an optical axis set in a direction substantially vertical to each substrate plane, and the first region includes a plurality of negative refraction members having optical axes which are tilted on a same side as that of the liquid crystal molecules in the predetermined cross section and whose tilt angles are set to have slight differences consecutively in the thickness direction.

According to a second aspect of the present invention, there is provided a liquid crystal display device which comprises: a liquid crystal cell in which liquid crystal molecules are held between a pair of substrates that produce an electric field corresponding to a voltage applied thereto, set in an alignment substantially vertical to each substrate plane when the voltage is not applied to the substrates, and set in an alignment that directors of the molecules are tilted in a predetermined cross section when the voltage is applied to the substrates; and an optical retardation plate arranged to face the liquid crystal cell; wherein the optical retardation plate includes first and second regions stacked in a thickness direction, the first region includes a plurality of negative refraction members having optical axes which are tilted on a same side as that of the liquid crystal molecules in the predetermined cross section and whose tilt angles are set to have slight differences consecutively in the thickness direction, and the second region includes a plurality of negative refraction members having optical axes which are tilted on an opposite side to that of the liquid crystal molecules in the predetermined cross section and whose tilt angles are set to have slight differences consecutively in the thickness direction.

According to a third aspect of the present invention, there is provided a liquid crystal display device which comprises: a liquid crystal cell in which liquid crystal molecules are held between a pair of substrates that produce an electric field corresponding to a voltage applied thereto; and a pair of optical retardation plates arranged to hold the liquid crystal cell therebetween; wherein each of the optical retardation plates includes first and second regions stacked in a thickness direction, the first region includes a plurality of negative refraction members having optical axes which are tilted on a predetermined side and whose tilt angles are set to have slight differences consecutively in the thickness direction, and the second region includes a plurality of negative refraction members having optical axes which are tilted on an opposite side to the predetermined side and whose tilt angles are set to have slight differences consecutively in the thickness direction.

According to a fourth aspect of the present invention, there is provided a liquid crystal display device which comprises: a liquid crystal cell in which liquid crystal molecules are held between a pair of substrates that produce an electric field corresponding to a voltage applied thereto, set in an alignment substantially vertical to each substrate plane when the voltage is not applied to the substrates, and set in an alignment that directors of the molecules are tilted in a predetermined cross section when the voltage is applied to the substrates; and a pair of optical retardation plates arranged to hold the liquid crystal cell therebetween; wherein each of the optical retardation plates includes first and second regions stacked in a thickness direction to have negative retardation that presents an optical axis set in a direction substantially vertical to each substrate plane, the first region includes a plurality of negative refraction members having optical axes which are tilted on a same side as that of the liquid crystal molecules in the predetermined cross section and whose tilt angles are set to have slight differences consecutively in the thickness direction, and the second region includes a plurality of negative refraction members having optical axes which are tilted on an opposite side as that of the liquid crystal molecules in the predetermined cross section and whose tilt angles are set to have slight differences consecutively in the thickness direction.

In the liquid crystal display devices, the optical retardation plate can compensate for the visual angle dependence of a retardation of the liquid crystal layer and the visual angle dependence of the polarizer with respect to all the transitional alignment states of the liquid crystal molecules. Therefore, the visual-angle-luminance characteristic at intermediate gradations can be improved without degrading the visual-angle-contrast characteristic. In particular, when alignment division is performed on the liquid crystal cell as in an MVA mode, even though the number of divided domains is two, the visual-angle-luminance characteristic at the intermediate gradations can be improved without degrading the visual-angle-contrast characteristic.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a diagram showing the relationship between an absorption axis of a polarizer and a slow axis of the optical retardation plate with respect to a liquid crystal panel shown in FIG. 3.

DETAILED DESCRIPTION OF THE INVENTION

A liquid crystal display device according to the first embodiment of the present invention will be described below with reference to the accompanying drawings. This liquid crystal display device is a transmissive type liquid crystal display device which performs a display in an MVA mode.

Figure 1:
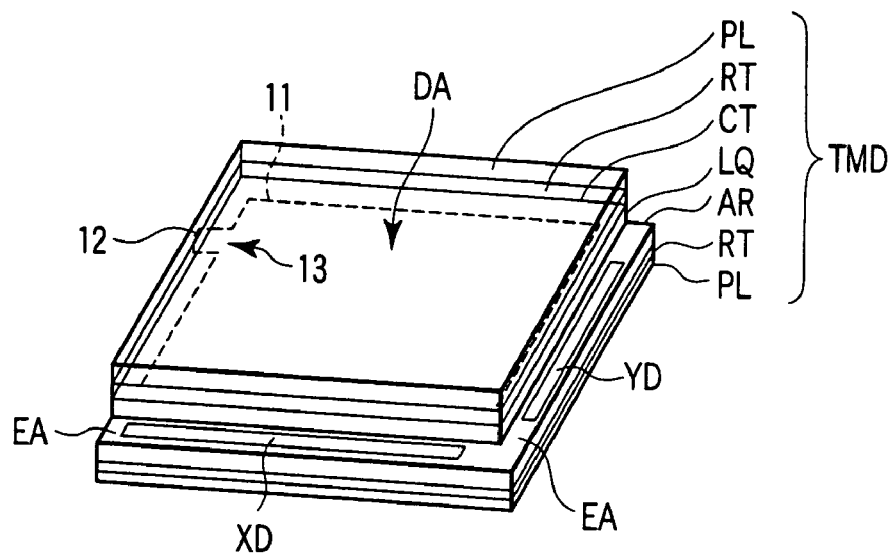
FIG. 1 is a diagram showing the appearance of a liquid crystal display device according to one embodiment of the present invention.
Figure 2:
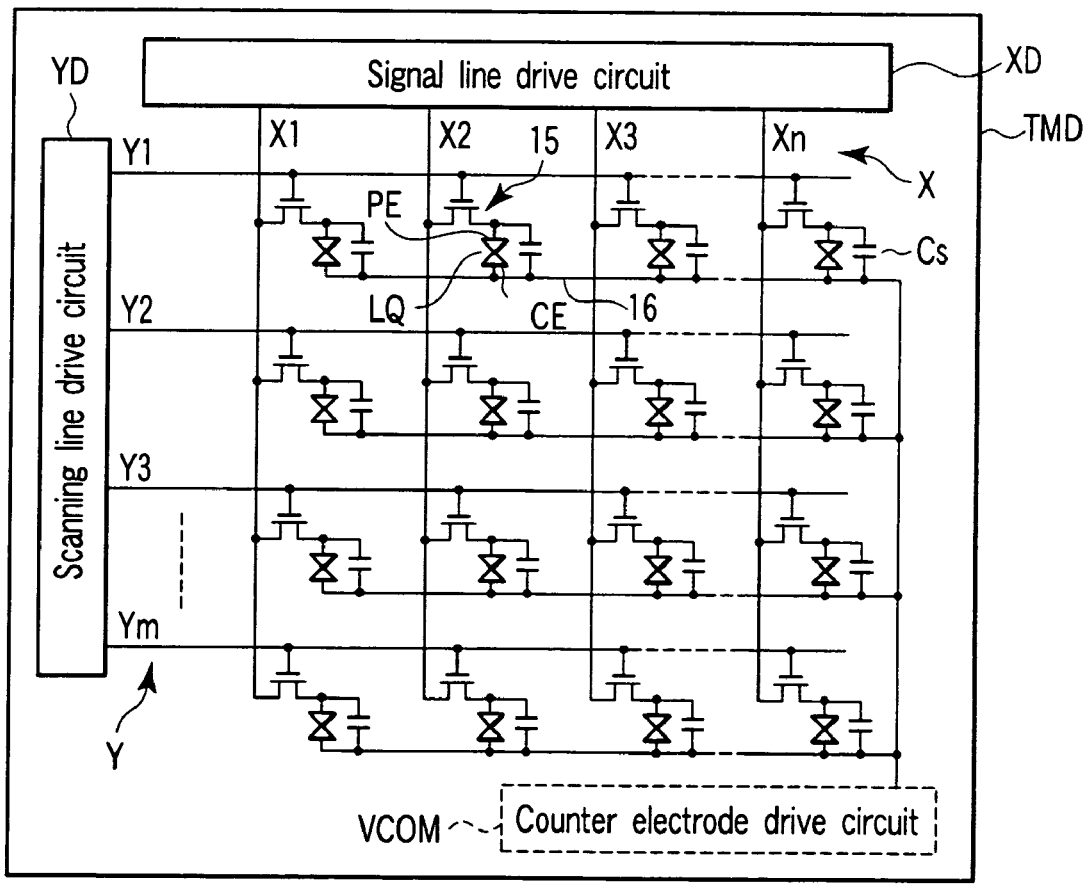
FIG. 2 is a schematic diagram showing the circuit structure of the liquid crystal display device shown in FIG. 1.
Figure 3:
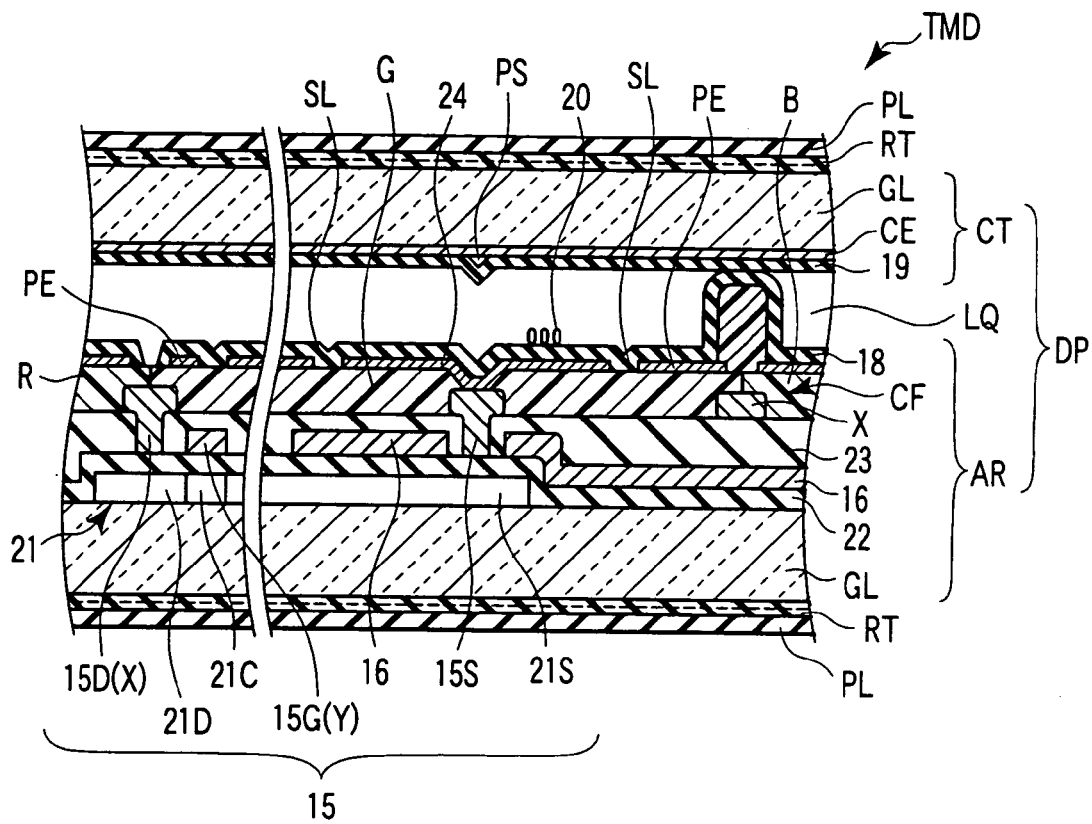
FIG. 3 is a diagram showing the sectional structure of the liquid crystal display device shown in FIG. 1.

FIG. 1 shows the appearance of the liquid crystal display device TMD, FIG. 2 schematically shows the circuit structure of the liquid crystal display device TMD shown in FIG. 1, and FIG. 3 shows the sectional structure of the liquid crystal display device TMD shown in FIG. 1.

As shown in FIG. 1, the liquid crystal display device TMD comprises an array substrate AR serving as a first electrode substrate, a counter substrate CT serving as a second electrode substrate opposing the first electrode substrate, a liquid crystal layer LQ containing a nematic liquid crystal material having negative dielectric anisotropy and held between the array substrate AR and the counter substrate CT, first and second polarizers PL holding a liquid crystal panel (liquid crystal cell) DP which is formed of the array substrate AR, the counter substrate CT, and the liquid crystal layer LQ, and first and second optical retardation plates RT arranged between the liquid crystal panel DP and the first polarizer PL and between the liquid crystal panel DP and the second polarizer PL. The array substrate AR and the counter substrate CT are stacked on each other by an outer-edge sealing member 11 arranged to surround the liquid crystal layer LQ. In the liquid crystal display device TMD, a display area DA for displaying an image is located inside the outer-edge sealing member 11, and a peripheral area EA for forming a drive circuit is located around the display area DA. A liquid crystal material is filled from a liquid crystal inlet port 12 after the array substrate AR and the counter substrate CT are stacked on each other. After the liquid crystal material is filled, the liquid crystal inlet port 12 is sealed by a sealing material 13.

The array substrate AR has, in the display area DA, as shown in FIG. 2, m×m pixel electrodes PE arrayed in the form of a matrix, m scanning lines Y (Y1 to Ym) arranged along the rows of pixel electrodes PE, n signal lines X (X1 to Xn) arranged along the columns of pixel electrodes PE, m x n pixel switches 15 arranged near intersections of the scanning lines Y1 to Ym and the signal lines X1 to Xn and assigned to the m×n pixel electrodes PE, and m storage capacitance lines 16 arranged of the row of the pixel electrodes PE. The scanning lines Y1 to Ym are almost perpendicular to the signal lines X1 to Xn, and arranged almost parallel to the storage capacitance lines 16. Each of the storage capacitance lines 16 is set at a predetermined potential obtained as a counter potential VCOM from a counter electrode drive circuit or the like. Each of the storage capacitance lines 16 is capacitively coupled to the pixel electrodes PE of a corresponding row to obtain storage capacitances Cs.

The array substrate AR has, in the peripheral area EA, a scanning line drive circuit YD for driving the scanning lines Y1 to Ym and a signal line drive circuit XD for driving the signal lines X1 to Xn. Each pixel switch 15 is formed of, e.g., a polysilicon thin film transistor and connected to a corresponding scanning line Y and a corresponding signal line X. The pixel switch 15 is turned on by a drive voltage from the corresponding scanning line Y, and applies a signal voltage from the corresponding signal line X to a corresponding pixel electrode PE. Each pixel switch 15 can be formed of not only the polysilicon thin film transistor but also an amorphous silicon thin film transistor.

The pixel electrodes PE are partitioned by the signal lines X and scanning lines Y of light-shielding conductive materials such as a metal, and slightly overlap the signal lines X and the scanning lines Y while being electrically insulated from the signal lines X and the scanning lines Y. The pixel electrode PE is formed of a transparent conductive material such as ITO disposed on a light-transmitting dielectric substrate GL such as a glass substrate, and spreads two-dimensionally to create an electric field in the pixel area of the liquid crystal layer LQ.

As shown in FIG. 3, in the array substrate AR, the pixel switches 15 are formed on the light-transmitting dielectric substrate GL and covered with a color filter CF. The color filter CF includes a red color filter layer R, a green color filter layer G, and a blue color filter layer B which are repeatedly arranged for the columns of pixel electrodes PE and each of which overlaps the pixel electrodes PE of a corresponding column. A plurality of columnar spacers 17 are formed on the color filter CF between the pixel electrodes PE. The color filter CF, the pixel electrodes PE, and the columnar spacers 17 are entirely covered with an alignment film 18. The alignment film 18 is formed of a transparent resin such as polyimide, and has a vertical alignment property provided without any rubbing process. The alignment film 18 aligns liquid crystal molecules 20 included in the liquid crystal material of the liquid crystal layer LQ in a direction almost vertical to the array substrate AR in a state where no voltage is applied.

The pixel switch 15 has a gate electrode 15G which overlaps a polysilicon semiconductor layer 21 on the dielectric substrate GL through a gate insulating film 22, a channel region 21C arranged under the gate electrode 15G in the semiconductor layer 21, a drain region 21D and a source region 21S which are formed on both the sides of the channel region 21C in the semiconductor layer 21 by doping an impurity, a drain electrode 15D connected to the drain region 21D, and a source electrode 15S connected to the source region 21S. The wiring layers such as the signal lines X, the scanning lines Y, and storage capacitance lines 16, and the gate electrodes 15G, the drain electrodes 15D, and the source electrodes 15S of the pixel switches 15 are formed by using a light-shielding conductive member such as aluminum, molybdenum, copper, and tantalum. More specifically, the scanning lines Y, the storage capacitance lines 16, and the gate electrodes 15G are formed by patterning the conductive layer covering the gate insulating film 22. In this embodiment, the gate electrode 15G serves as part of the scanning line Y.

The signal lines X, the drain electrodes 15D, and the source electrodes 15S are formed by patterning a conductive layer formed on an interlayer insulating film 23 covering the scanning lines Y, the storage capacitance lines 16, the gate electrodes 15G, and the gate insulating film 22. In this case the drain electrode 15D is formed in contact with the drain region 21D within a contact hole which penetrates the gate insulating film 22 and the interlayer insulating film 23 and is integrated with the signal line X, and the source electrode 15S is formed in contact with the source region 21S in a contact hole which penetrates the gate insulating film 22 and the interlayer insulating film 23. The source region 21S opposes the storage capacitance line 16 through the gate insulating film 22. The color filter CF is formed to cover the signal lines X, the drain electrodes 15D, and the source electrodes 15S. The pixel electrode PE is formed in contact with the source electrode 15S of the pixel switch 15 within a contact hole 24 which penetrate the color filter CF. The source region 21S and the pixel electrode PE are capacitively coupled to the storage capacitance lines 16 to constitute the storage capacitance Cs.

In the counter substrate CT, the counter electrode CE is formed of a transparent conductive material such as ITO formed on the light-transmitting dielectric substrate GL such as a glass substrate. The alignment film 19 is formed to cover the counter electrode CE. The alignment film 19 is formed of a transparent resin such as polyimide, and has a vertical alignment property provided without any rubbing process. The counter electrode CE is arranged to oppose all the pixel electrodes PE arrayed on the array substrate AR side. The alignment film 19 aligns the liquid crystal molecules 20 included in the liquid crystal material of the liquid crystal layer LQ in a direction almost vertical to the counter substrate CT.

The first and second optical retardation plates RT are stacked on the array substrate AR and the counter substrate CT on the opposite side of the liquid crystal layer LQ, respectively, and the first and second polarizers PL are stacked on the first and second optical retardation plates RT, respectively.

In this embodiment, a color-filter-on-array substrate (COA) structure in which the color filter CF is located on the array substrate AR is employed. However, the color filter CF may be located on the counter substrate CT. With the COA structure, highly accurate alignment using alignment marks or the like is not required to bond the array substrate AR and the counter substrate CT on each other during the manufacture of the liquid crystal panel DP.

Figure 4:
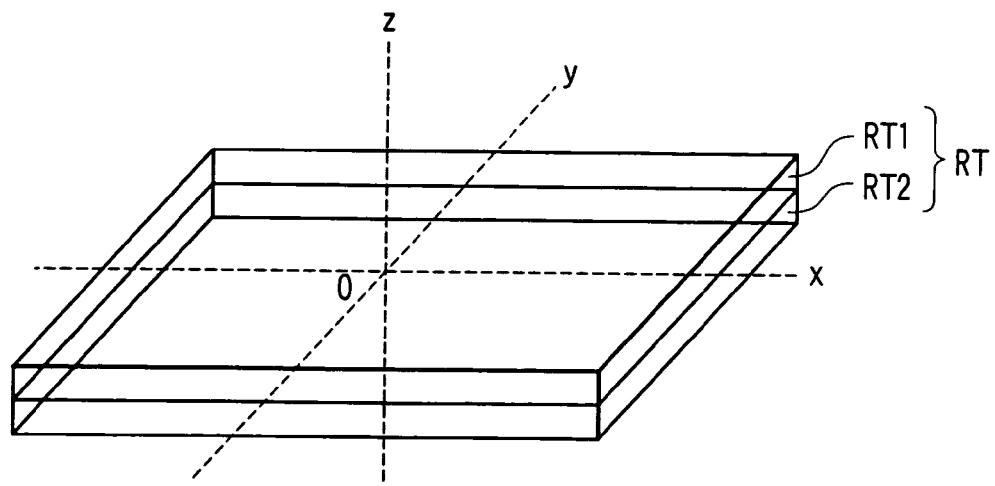
FIG. 4 is a diagram for explaining the structure of an optical retardation plate shown in FIG. 2.
Figure 5:
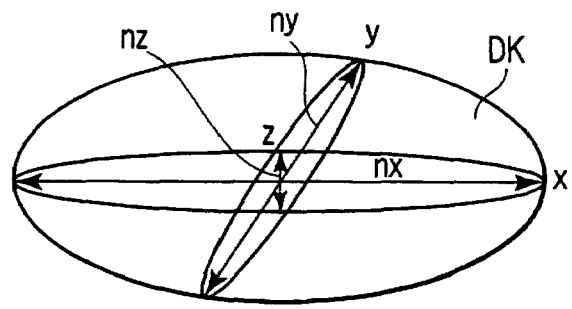
FIG. 5 is a diagram showing a discotic polymer serving as a refractive elliptic body in an optical film shown in FIG. 4.

The structure of each optical retardation plate will be described below with reference to FIGS. 4 to 8. The optical retardation plate RT has at least one pair of first and second optical films RT1 and RT2 to compensate for the visual angle dependence of a retardation produced in the liquid crystal layer LQ of the liquid crystal panel DP. As shown in FIG. 4, the optical retardation plate RT is set in a state where the direction of thickness coincides with the z-axis of the x-axis, the y-axis, and the z-axis which are perpendicular to each other. Each of the optical films RT1 and RT2 includes one group of refractive elliptic bodies constituted by discotic polymers in which average refractive indices nx, ny, and nz in the x-axis direction, the y-axis direction, and the z-axis direction satisfy nx=ny>nz as shown in FIG. 5.

Figure 6:
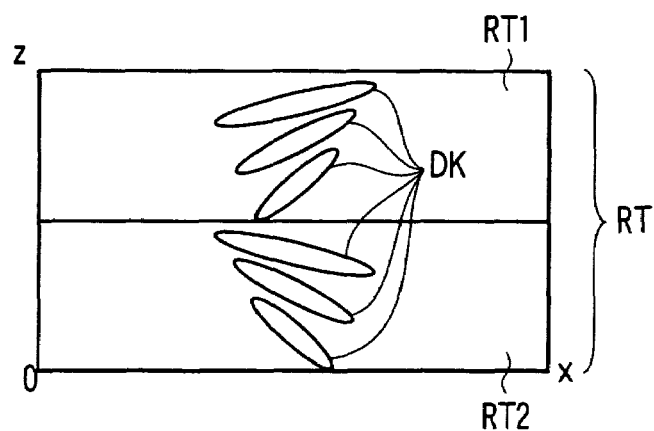
FIG. 6 is a diagram showing the y-orientation profile of the optical retardation plate RT parallel to an x-z plane including an x-axis and a z-axis shown in FIG. 4.
Figure 7:
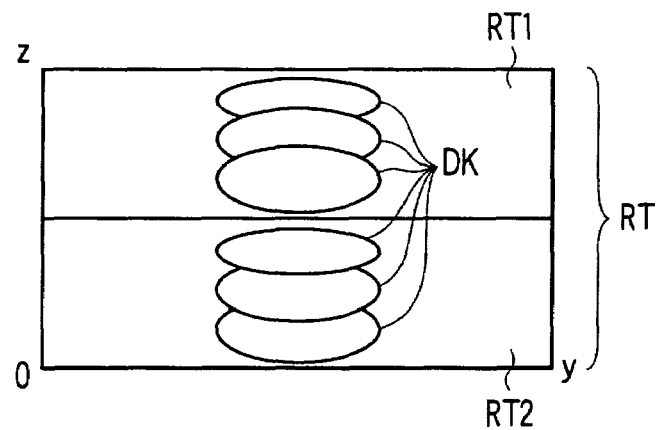
FIG. 7 is a diagram showing the x-orientation profile of the optical retardation plate parallel to a y-z plane including a y-axis and the z-axis shown in FIG. 4.
Figure 8:
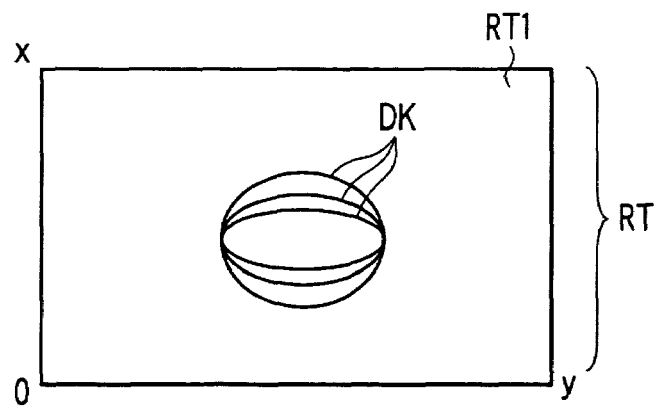
FIG. 8 is a diagram showing the z-orientation profile of the optical retardation plate parallel to an x-y plane including the x-axis and the y-axis shown in FIG. 4.

FIG. 6 shows the y-orientation profile of the optical retardation plate RT parallel to the x-z plane including the x-axis and the z-axis, FIG. 7 shows the x-orientation profile of the optical retardation plate parallel to a y-z plane including the y-axis and the z-axis, and FIG. 8 shows a z-orientation profile of the optical retardation plate parallel to an x-y plane including the x-axis and the y-axis.

The first optical film RT1 is provided with hybrid alignment of the refractive elliptic bodies DK which are arranged in the direction of thickness and gradually tilted with respect to the x-y plane perpendicular to the direction of thickness. The second optical film RT2 is provided with hybrid alignment of the refractive elliptic bodies DK which are arranged in the direction of thickness and gradually tilted to be antiparallel to the tilt direction of the refractive elliptic bodies DK in the first optical film RT1. In this case, wide-view films (WVF) available from Fuji Photo Film Co., Ltd., are used as the first and second optical films RT1 and RT2. Each wide-view film is formed by polymerizing a discotic liquid crystal of the hybrid alignment. The optical retardation plate RT is attainable by stacking a pair of wide-view films such that the tilt direction of the discotic liquid crystal molecules DK in one wide-view film is set in antiparallel to that of the discotic liquid crystal molecules DK in the other wide-view film.

Each wide-view film has refractive anisotropy in which the average refractive indices nx and ny in the x-axis direction and the y-axis direction satisfy nx>ny with respect to an average tilt angle of all the discotic liquid crystal molecules DK in the film. When the average tilt angle is set at 45° or less with respect to the x-y plane, the relationship nx>ny>nz is satisfied. When the optical retardation plate RT is formed by stacking the pair of wide-view films as described above, the discotic liquid crystal molecule DK having a positive tilt angle with respect to the x-y plane and the discotic liquid crystal molecule DK having a negative tilt angle with respect to the x-y plane are paired. This state is equivalent to a state where the refractive elliptic bodies of the entire optical retardation plate RT are not tilted with respect to the x-y plane. Therefore, the optical retardation plate RT has the same function as a biaxial ARTON film which is available from JSR Corporation and biaxial-oriented to cause the refractive anisotropies of the refractive elliptic bodies to satisfy nx>ny>nz. In this embodiment, the optical films RT1 and RT2 constitute the optical retardation plate RT having a slow axis in the x-axis direction as a whole.

In a case where the first and second polarizers PL are crossed Nicol polarizers, when the first and second optical retardation plates RT are set in a cross-Nicol as shown in FIG. 9, the anisotropy of the average refractive indices obtained for all the four wide-view films (WVF) satisfies nx=ny>nz, thereby causing the pair of first and second optical retardation plates RT to function as a negative uniaxial film (negative refraction member). The liquid crystal panel DP can be regarded as a positive uniaxial film in a state where the liquid crystal molecules 20 of the liquid crystal layer LQ are set substantially in vertical alignment for a black display. Therefore, the refractive anisotropies of the negative uniaxial film and the positive uniaxial film compensate for each other, and the visual angle dependence of retardation produced in the liquid crystal layer LQ can be canceled in a black display state. In addition, as shown in FIG. 9, the first and second optical retardation plates RT have slow axes 31 orthogonal to the absorption axes 30 of the first and second polarizers PL arranged on the upper and lower surfaces of the optical retardation plates RT, so that the visual angle dependences of the first and second polarizers PL can be compensated for.

The first and second polarizers PL shown in FIG. 9 are crossed Nicol polarizers. However, the polarizers may be replaced with parallel-Nicol polarizers. Even though the first and second optical retardation plates RT are arranged between these parallel-Nicol polarizers, the above effect can be obtained. When the liquid crystal molecules 20 are set substantially in vertical alignment in any one of a voltage-applied state and a no-voltage-applied state, the visual angle dependence of the retardation produced in the liquid crystal layer LQ can be canceled.

The discotic liquid crystal molecules DK in one of the two wide-view films have positive tilt angles with respect to the plane of the liquid crystal layer LQ, and the discotic liquid crystal molecules DK in the other one of the two wide-view films have negative tilt angles with respect to the plane of the liquid crystal layer LQ. When the two wide-view films are stacked to constitute the optical retardation plate RT, the discotic liquid crystal molecules DK whose tilt angle is positive and the discotic liquid crystal molecules DK whose tilt angle is negative are paired in the optical retardation plate RT, and the tilt angles are set to have slight differences consecutively in the direction of thickness of the optical retardation plate RT. In general, a TN mode, a VA mode (including an MVA mode), a homogeneous mode, a hybrid align mode, an optical compensated bent mode, and a super twisted nematic mode are liquid crystal display modes in which the retardation and the optical rotary power of the liquid crystal layer LQ are controlled by applying an electric field to the liquid crystal layer LQ in the normal direction. When such a liquid crystal display mode is employed, the liquid crystal molecules 20 whose tilt angle is positive with respect to the plane of the liquid crystal layer LQ and the liquid crystal molecules 20 whose tilt angle is negative with respect to the plane are paired in the liquid crystal alignment for a white display of intermediate gradations using crossed Nicol polarizers, a black display using parallel-Nicol polarizers, a white display using antipolarity circular polarizers holding the liquid crystal panel therebetween, or a black display using parallel polarizers holding the liquid crystal panel therebetween. The tilt angles are set to have slight differences consecutively in the direction of thickness of the liquid crystal layer LQ. Therefore, when the optical retardation plate RT is configured to cancel out the tilt angles and amounts of retardation of the liquid crystal molecules 20 of the liquid crystal layer LQ by the tilt angles and amounts of retardation of the discotic liquid crystal molecules DK, the visual angle dependences are compensated for during the white display of intermediate gradations using crossed Nicol polarizers, the black display using parallel-Nicol polarizers, the white display using antipolarity circular polarizers holding the liquid crystal panel therebetween, or the black display using parallel polarizers holding the liquid crystal panel therebetween.

The retardation values of the optical retardation plate RT are given by $(nx-ny)t=50$ nm and $(nx-nz)t=120$ nm when the thickness of the optical retardation plate RT is represented by t. The values are design values obtained when a value $\Delta nd$ obtained by multiplying the thickness d of the liquid crystal layer LQ by a refractive anisotropy Δn of the liquid crystal material is set at 290 nm.

The MVA mode belongs to an electrically controlled birefringence (ECB) mode that uses an electric field to control the retardation of the liquid crystal layer LQ. The transmittance T (LC) of the liquid crystal layer LQ in a cross-Nicole system is given by the following equation:

$$T(LC)=I_0 \cdot \sin^2(2\theta) \cdot \sin^2((\Delta n(\lambda,V) \cdot d/\lambda) \cdot \pi) \quad \text{(Equation 1)}$$

where $I_0$ is the parallel transmittance of the polarizer PL, θ is the angle between the slow axis of the liquid crystal layer LQ and the transmission axis of the polarizer, V is the applied voltage, d is the thickness of the liquid crystal layer LQ, and λ is the wavelength of incident light. In equation 1, the refractive anisotropy Δn(λ,V) depends on the effective applied voltage in the area and the tilt angles of the nematic liquid crystal molecules 20. In order to change T(LC) from 0 to $I_0$, Δn(λ,V)d/λ must be changed in the range of 0 to λ/2. In the MVA mode, the nematic liquid crystal molecules 20 on the surfaces of alignment films are rarely tilted even though a voltage is applied to the liquid crystal molecules 20.

In order to change Δn(λ,V)d/λ in a range of 0 to λ/2, a value Δnd obtained by multiplying the thickness d of the liquid crystal layer by the refractive anisotropy Δn of the liquid crystal material must be made sufficiently larger than a half of a wavelength of 550 nm at which a high visual angle can be obtained, more specifically, 270 nm or more. However, when the value is made excessively large, electro-optical characteristics are excessively sharp. For this reason, the upper limit of the value is about 350 nm. When the liquid crystal molecules 20 of the liquid crystal layer LQ having the value Δnd falling within this range are almost vertically aligned, negative retardation from −350 nm to −270 nm is required to compensate for the positive retardation of the liquid crystal layer LQ. A TAC serving as a base film of the polarizer PL has an almost uniaxial negative retardation. More specifically, the TAC has negative retardation of −70 nm. Since the pair of polarizers PL include two base films arranged inside polarizing layers, this provides a state where a negative retardation film of −140 nm exists between the pair of polarizers PL. Therefore, when the liquid crystal molecules 20 of the liquid crystal layer LQ having the value of Δnd described above are almost vertically aligned, it is required that an optical retardation plate RT having negative retardation falling within the range of −280 nm to −200 nm is additionally provided between the two polarizers PL in order to compensate for positive retardation of the liquid crystal layer LQ.

In order to comply with the requirement by the first and second optical retardation plates RT, the first and second optical retardation plates RT may be arranged in a cross-Nicol and (nx−nz)t of each of the optical retardation plates RT may be set to satisfy 100 nm≦(nx−nz)t≦140 nm. At the same time, in order to compensate for the visual angle dependences of the first and second polarizers PL, (nx−nz)t−(nx−ny)t=70 nm may be satisfied. Therefore, (nx−ny)t may satisfy 30 nm≦(nx−ny)t≦70 nm.

Figure 10:
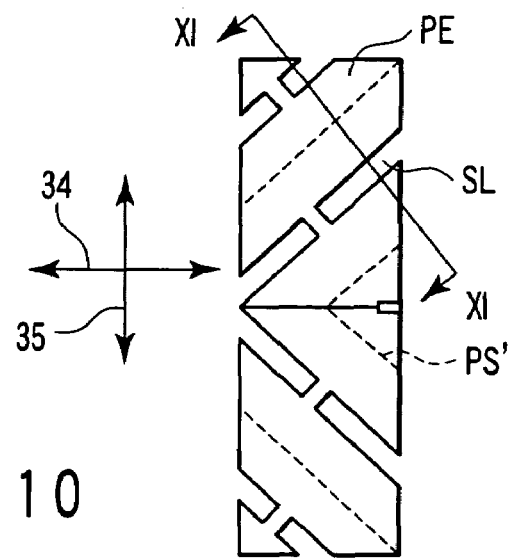
FIG. 10 is a diagram showing the planar structure of a pixel electrode shown in FIG. 3.
Figure 11:
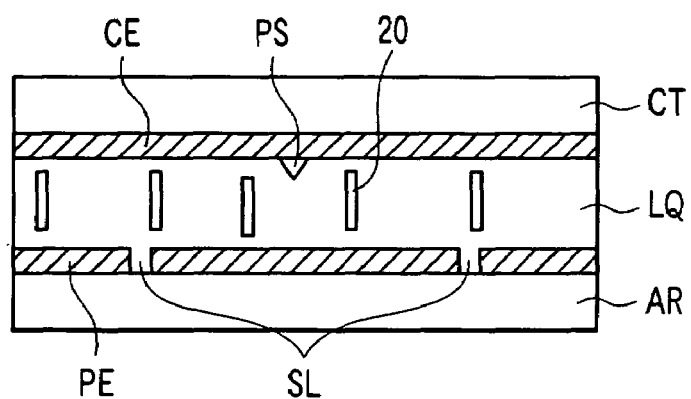
FIG. 11 is a diagram showing the liquid crystal molecular alignment obtained in a liquid crystal layer when no voltage is applied from the pixel electrode shown in FIG. 10.
Figure 12:
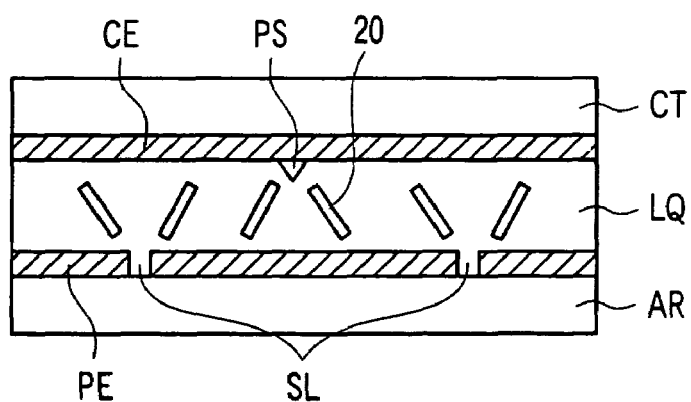
FIG. 12 is a diagram showing the liquid crystal molecular alignment obtained in a liquid crystal layer when a voltage is applied from the pixel electrode shown in FIG. 10.

FIG. 10 shows the planar structure of the pixel electrode PE, FIG. 11 shows the liquid crystal molecular alignment obtained in the liquid crystal layer LQ when no voltage is applied from the pixel electrode PE, and FIG. 12 shows the liquid crystal molecular alignment obtained in the liquid crystal layer LQ when a voltage is applied from the pixel electrode PE. In FIGS. 10 to 12, the thin film transistors 15, the alignment film 18, the color filter CF, and the like are omitted. In the liquid crystal panel DP, a plurality of pixel electrodes PE define a plurality of pixel areas in each of which the liquid crystal molecules 20 change, upon application of a voltage, between a vertical alignment state and a hybrid alignment state where the tilt angles thereof are set to have slight differences consecutively in the thickness direction. Each pixel area is divided into four domains in which the alignment directions of the liquid crystal molecules 20 are made different from each other in the hybrid alignment state. In order to perform alignment division, as shown in FIGS. 10 to 12, slits SL are formed at the pixel electrode PE, and projections PS are formed parallel to the slits SL at the counter electrode CE of the counter substrate CT. The projections PS are formed by patterning a transparent resist (available from JSR Corporation) with a height of 1 μm. In FIG. 10, reference symbol PS' denotes a planar arrangement of the projections PS with respect to the pixel electrode PE, reference numeral 34 denotes a rubbing direction of a rubbing process performed for alignment division on the alignment film 18 covering the pixel electrodes PE, and reference numeral 35 denotes a rubbing boundary at which areas rubbed in different directions are adjacent to each other. In such a structure, the liquid crystal molecules 20 in the pixel areas are, as shown in FIG. 11, almost vertically aligned in a no-voltage-applied state, and are, as shown in FIG. 12, tilted in a direction perpendicular to the projection PS and the slits SL and symmetrically aligned on both the sides of the projection PS and the slit SL in a voltage-applied state. Therefore, as shown in FIG. 10, the projections PS and the slits SL are set in two perpendicular directions so that liquid crystal molecules can be aligned to make angles of 90° between the four domains. When the absorption axis of the polarizer PL is set to have an angle θ of 45° with respect to the tilted liquid crystal molecules 20, the transmittance T (LC) of the liquid crystal layer LQ can be changed within the range of 0 to $I_0$.

Figure 13:
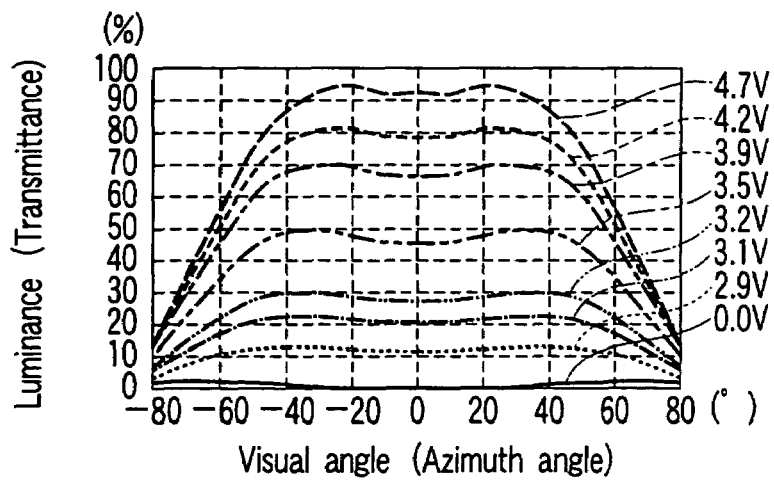
FIG. 13 is a graph showing the visual-angle-luminance characteristic of the liquid crystal display device actually measured by shifting the visual angle right and left from the frontal direction of the panel shown in FIG. 1.
Figure 14:
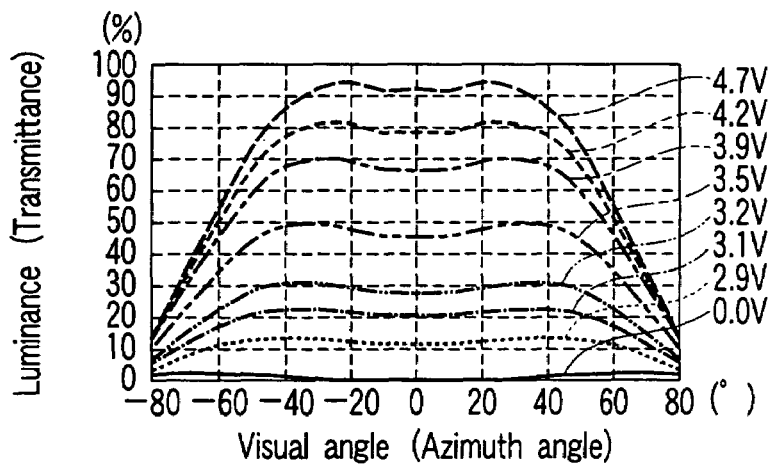
FIG. 14 is a graph showing the visual-angle-luminance characteristic of the liquid crystal display device actually measured by shifting the visual angle diagonally from the frontal direction of the panel shown in FIG. 1.
Figure 15:
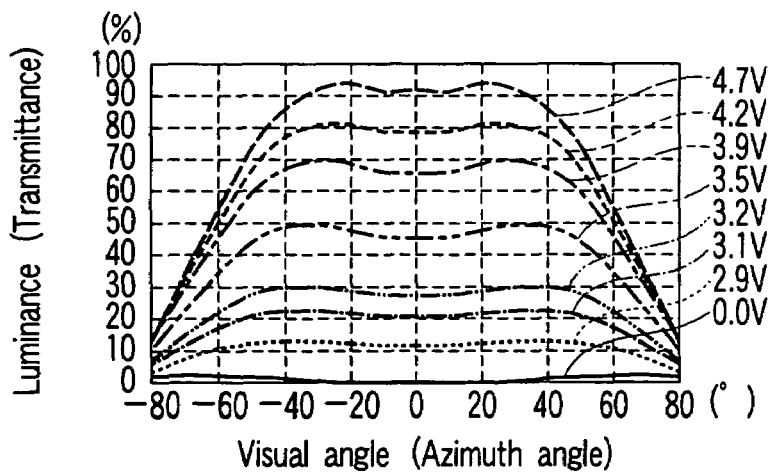
FIG. 15 is a graph showing the visual-angle-luminance characteristic of the liquid crystal display device actually measured by shifting the visual angle upward and downward from the frontal direction of the panel shown in FIG. 1.
Figure 16:
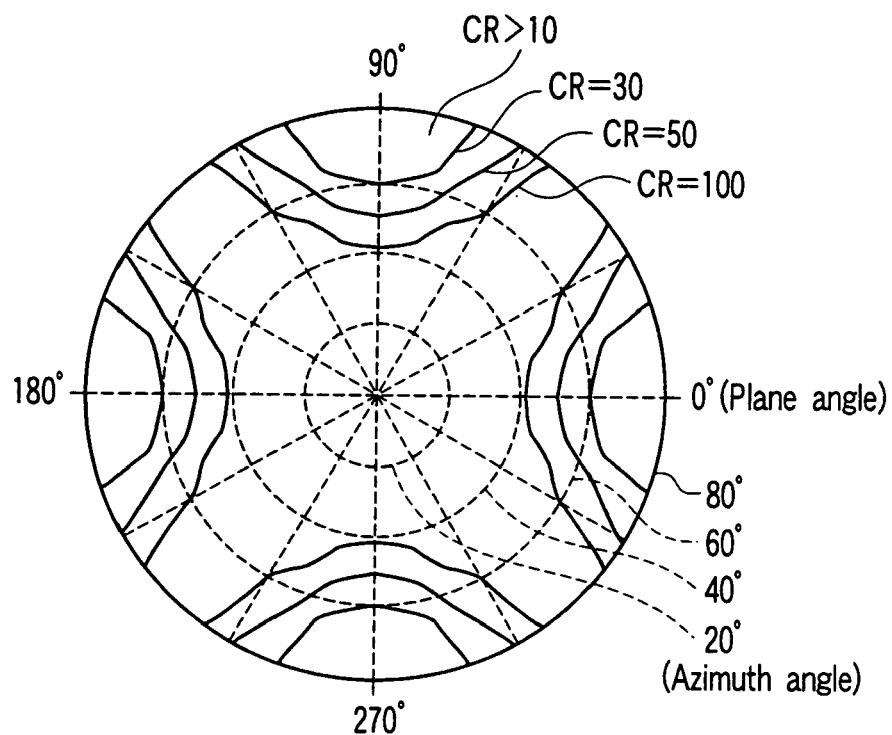
FIG. 16 is a graph showing the visual-angle-contrast characteristic of the liquid crystal display device shown in FIG. 1, actually measured.
Figure 24:
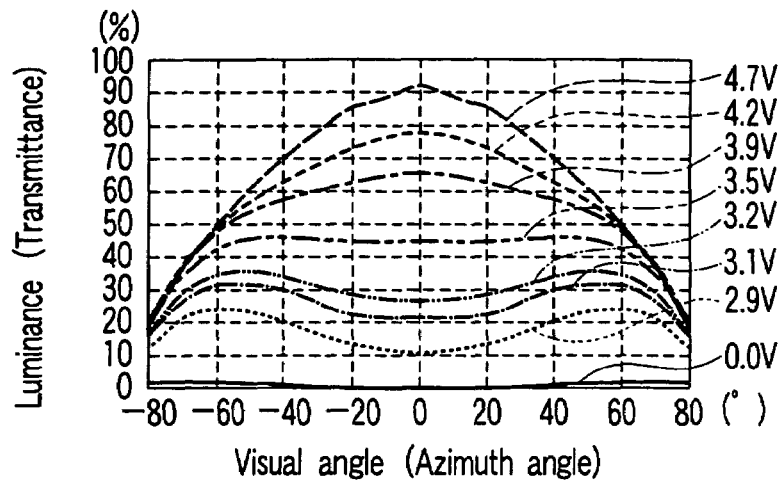
FIG. 24 is a graph showing the visual-angle-luminance characteristic actually measured by shifting the visual angle right and left from the frontal direction of the panel of a conventional MVA mode liquid crystal display device in which the number of divided domains is four.
Figure 25:
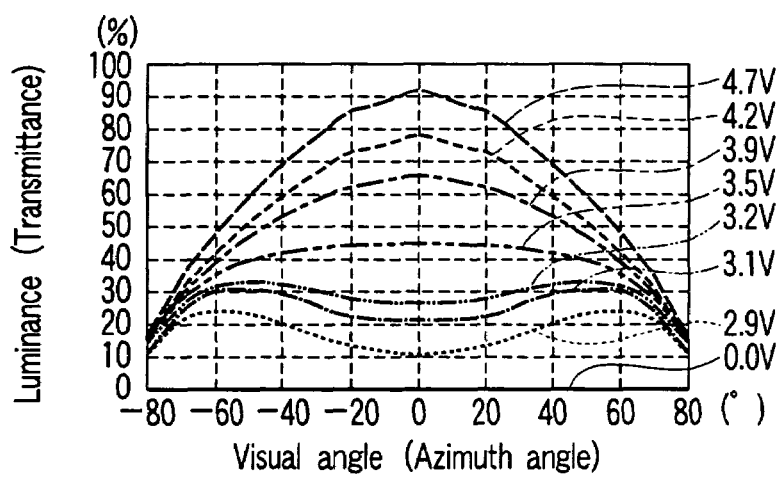
FIG. 25 is a graph showing the visual-angle-luminance characteristic actually measured by shifting the visual angle diagonally from the frontal direction of the panel of the MVA mode liquid crystal display device shown in FIG. 24.
Figure 26:
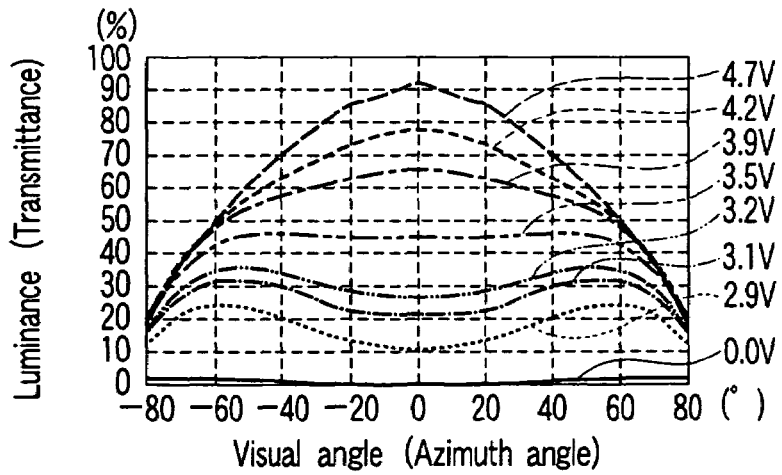
FIG. 26 is a graph showing the visual-angle-luminance characteristic actually measured by shifting the visual angle upward and downward from the frontal direction of the panel of the MVA mode liquid crystal display device shown in FIG. 24.
Figure 30:
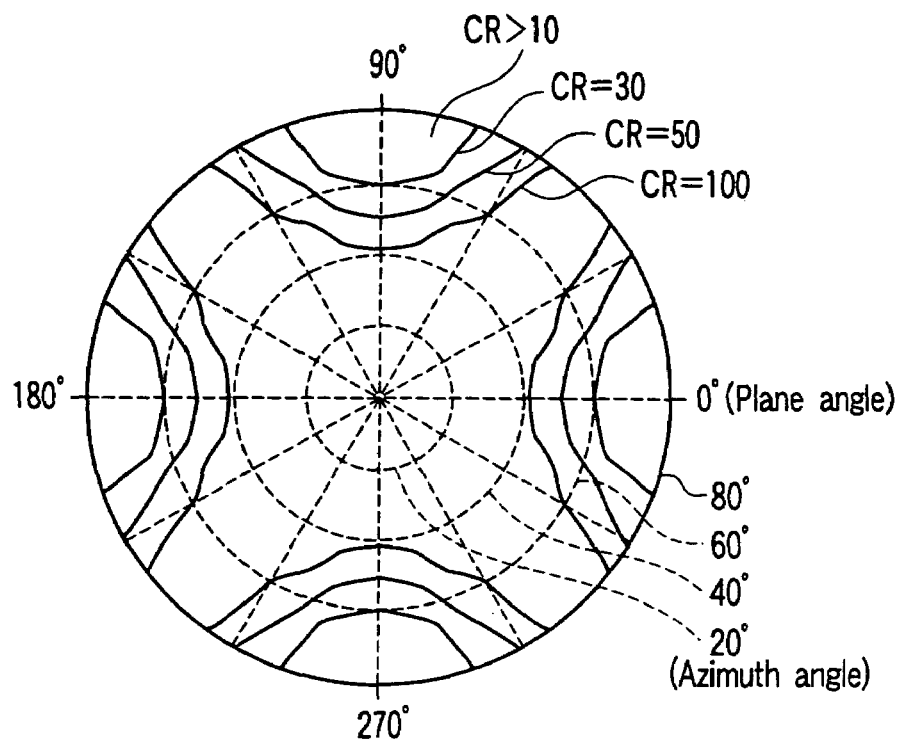
FIG. 30 is a graph showing the visual-angle-contrast characteristic of the MVA mode liquid crystal display device shown in FIG. 24, actually measured.

FIG. 13 shows the visual-angle-luminance characteristic of the liquid crystal display device actually measured by shifting the visual angle right and left from the frontal direction of a panel shown, FIG. 14 shows the visual-angle-luminance characteristic of the liquid crystal display device actually measured by shifting the visual angle diagonally from the frontal direction of the panel, and FIG. 15 shows the visual-angle-luminance characteristic of the liquid crystal display device actually measured by shifting the visual angle upward and downward from the frontal direction of the panel. In this case, a voltage ranging from 0 to 4.7 V is applied to the liquid crystal layer LQ. The abscissa indicates the visual or observation angle where 0° corresponds to the frontal direction of the panel, and the ordinate indicates the luminance of the panel which is expressed by a transmittance. Zero volts corresponds to the voltage assigned to the (minimum) gradation for a black display, and 4.7 V corresponds to the voltage assigned to the (maximum) gradation for a white display. In FIGS. 13 to 15, intervals of the characteristic curves are kept at an almost constant value for each visual angle. The visual-angle-luminance characteristic is apparently improved in comparison with the visual-angle-luminance characteristic obtained in the conventional MVA mode liquid crystal display device and shown in FIGS. 24 to 26. Accordingly, it is possible to solve the problem that a multicolor image displayed in the conventional MVA mode liquid crystal display device entirely looks brownish-white when the image is observed in an inclined direction. FIG. 16 shows a visual-angle-contrast characteristic of the liquid crystal display device of this embodiment, actually measured. In this case, the liquid crystal display device is driven by a voltage of 4.7 V assigned to the (maximum) gradation for a white display. The visual-angle-contrast characteristic has contrast ratios (CR) of 10 or more in all directions. That is, it is apparent that an excellent viewing-angle property which is substantially the same as that in the conventional MVA mode liquid crystal display device shown in FIG. 30 is obtained.

A liquid crystal display device according to a second embodiment of the present invention will be described below. The liquid crystal display device manufactured by using the same structure, manufacturing method, and materials as those in the first embodiment except that the number of divided domains is set at two.

Figure 17:
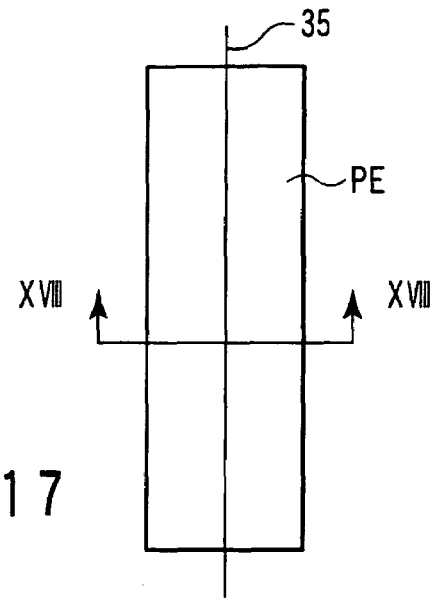
FIG. 17 is a diagram showing the planar structure of a pixel electrode of a liquid crystal display device according to a second embodiment of the present invention.
Figure 18:
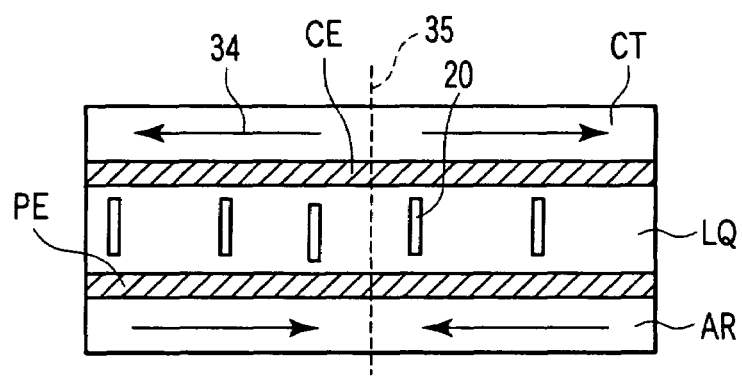
FIG. 18 is a diagram showing the alignment of liquid crystal molecules obtained in a liquid crystal layer when no voltage is applied from the pixel electrode shown in FIG. 17.
Figure 19:
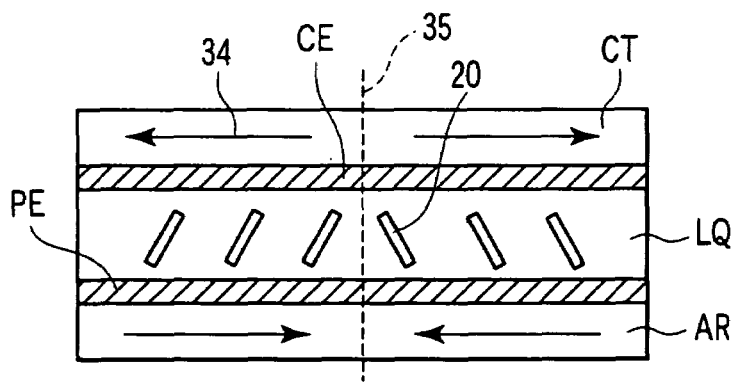
FIG. 19 is a diagram showing the alignment of liquid crystal molecules obtained in the liquid crystal layer when a voltage is applied from the pixel electrode shown in FIG. 17.

FIG. 17 shows the planar structure of a pixel electrode PE, FIG. 18 shows the alignment of liquid crystal molecules obtained in a liquid crystal layer LQ when no voltage is applied from the pixel electrode PE, and FIG. 19 shows the alignment of liquid crystal molecules obtained in a liquid crystal layer LQ when a voltage is applied from the pixel electrode PE. In FIGS. 17 to 19, the thin film transistors 15, the alignment film 18, the color filter CF, and the like are omitted. In a liquid crystal panel DP, a plurality of pixel electrodes PE define a plurality of pixel areas in each of which the liquid crystal molecules 20 change, upon application of a voltage, between a vertical alignment state and a hybrid alignment state where the tilt angles thereof are set to have slight differences consecutively in the thickness direction, in the same manner as that in the first embodiment. Each pixel area is divided into two domains in which the alignment directions of the liquid crystal molecules 20 are made different from each other in the hybrid alignment state. In order to perform alignment division, an array substrate AR and a counter substrate CT are rubbed by a mask rubbing method such that the pixel area is divided into two at a rubbing boundary 35 as shown in FIGS. 18 and 19. More specifically, the rubbing directions on both the sides of the rubbing boundary 35 are made different from each other such that the liquid crystal molecules 20 are tilted in directions symmetrical about the rubbing boundary 35 serving as an axis when a voltage is applied to the liquid crystal layer LQ. Therefore, the liquid crystal molecules 20 are tilted in two directions which make an angle of 180°. When the absorption axis of the polarizer PL is set to have an angle θ of 45° with respect to the tilted liquid crystal molecules 20, the transmittance T (LC) of the liquid crystal layer LQ can be changed within the range of 0 to $I_0$.

Figure 20:
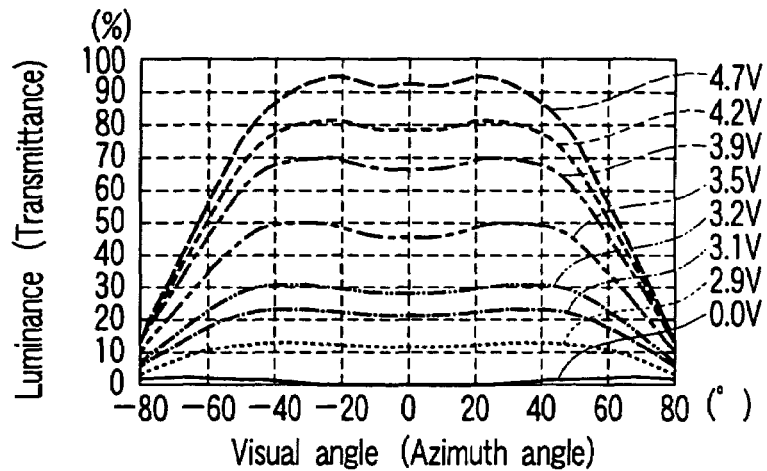
FIG. 20 is a graph showing the visual-angle-luminance characteristic of the liquid crystal display device actually measured by shifting the visual angle right and left from the frontal direction of the panel when the pixel electrode shown in FIG. 17 is used.
Figure 21:
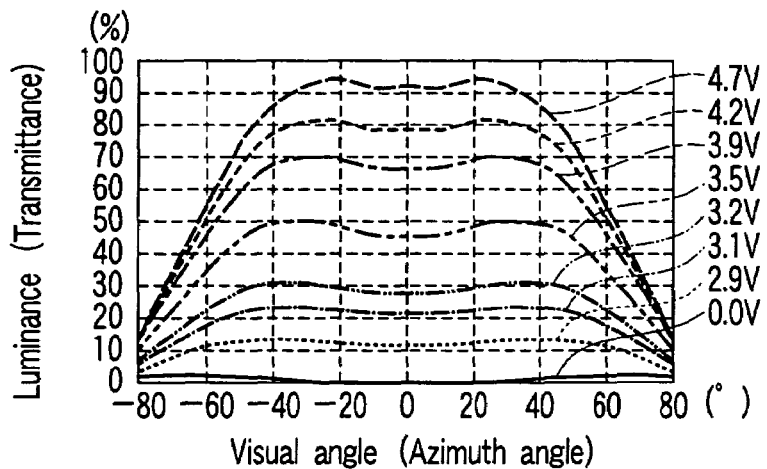
FIG. 21 is a graph showing the visual-angle-luminance characteristic of the liquid crystal display device actually measured by shifting the visual angle diagonally from the frontal direction of the panel when the pixel electrode shown in FIG. 17 is used.
Figure 22:
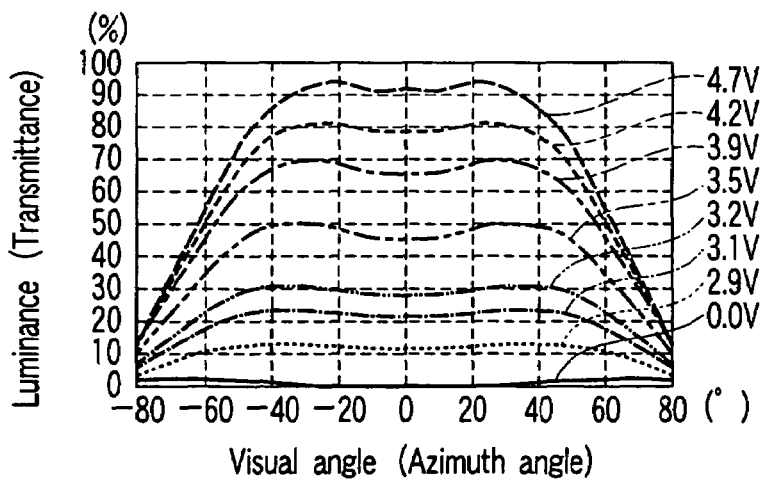
FIG. 22 is a graph showing the visual-angle-luminance characteristic of the liquid crystal display device actually measured by shifting the visual angle upward and downward from the frontal direction of the panel when the pixel electrode shown in FIG. 17 is used.
Figure 27:
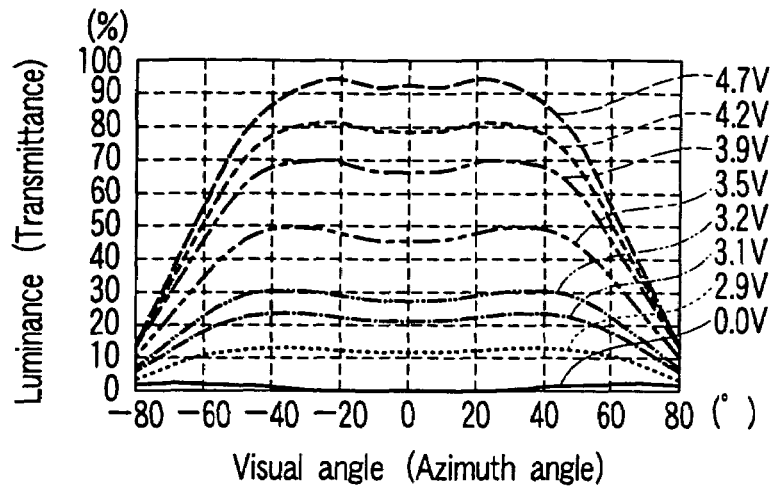
FIG. 27 is a graph showing the visual-angle-luminance characteristic actually measured by shifting the visual angle right and left from the frontal direction of the panel of a conventional MVA mode liquid crystal display device in which the number of divided domains is two.
Figure 28:
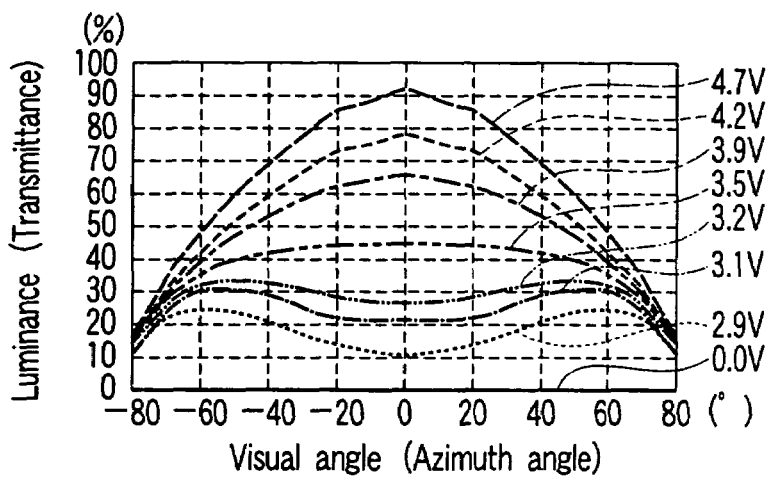
FIG. 28 is a graph showing the visual-angle-luminance characteristic actually measured by shifting the visual angle diagonally from the frontal direction of the panel of the MVA mode liquid crystal display device shown in FIG. 27.
Figure 29:
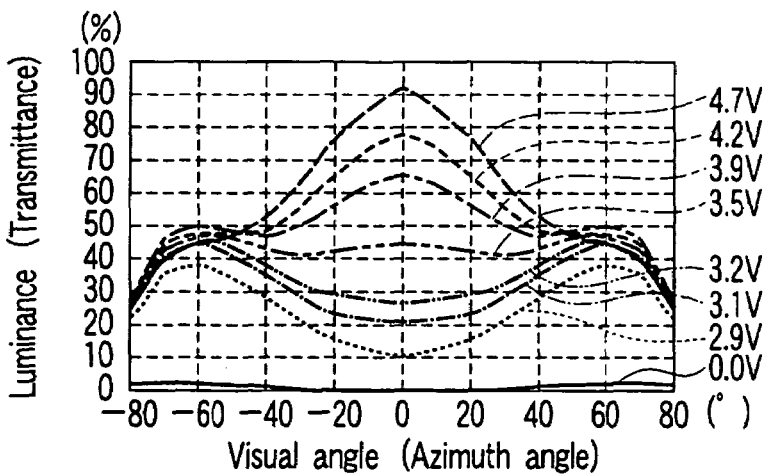
FIG. 29 is a graph showing the visual-angle-luminance characteristic actually measured by shifting the visual angle upward and downward from the frontal direction of the panel of the MVA mode liquid crystal display device shown in FIG. 27.

FIG. 20 shows the visual-angle-luminance characteristic of the liquid crystal display device actually measured by shifting the visual angle left and right from the frontal direction of the panel, FIG. 21 shows the visual-angle-luminance characteristic of the liquid crystal display device actually measured by shifting the visual angle diagonally from the frontal direction of the panel, and FIG. 22 shows the visual-angle-luminance characteristic of the liquid crystal display device actually measured by shifting the visual angle upward and downward from the frontal direction of the panel. In this case, a voltage ranging from 0 to 4.7 V is applied to the liquid crystal layer LQ. The abscissa indicates the visual or observation angle where 0° corresponds to the frontal direction of the panel, and the ordinate indicates the luminance of the panel which is expressed in terms of transmittance. Zero volts corresponds to the voltage assigned to the (minimum) gradation for a black display, and 4.7 V corresponds to the voltage assigned to the (maximum) gradation for a white display. In FIGS. 20 to 22, intervals of the characteristic curves are kept at an almost constant values for each visual angle. The visual-angle-luminance characteristic is apparently improved in comparison with the visual-angle-luminance characteristic obtained in the conventional MVA mode liquid crystal display device in which the number of divided domains is two, and shown in FIGS. 27 to 29. This visual-angle-luminance characteristic is also improved in comparison with the visual-angle-luminance characteristic obtained in the conventional MVA mode liquid crystal display device in which the number of divided domains is four, and shown in FIGS. 24 to 26. Accordingly, it is possible to solve the problem that a multicolor image displayed in the conventional MVA mode liquid crystal display device entirely looks brownish-white when the image is observed in an inclined direction.

Figure 23:
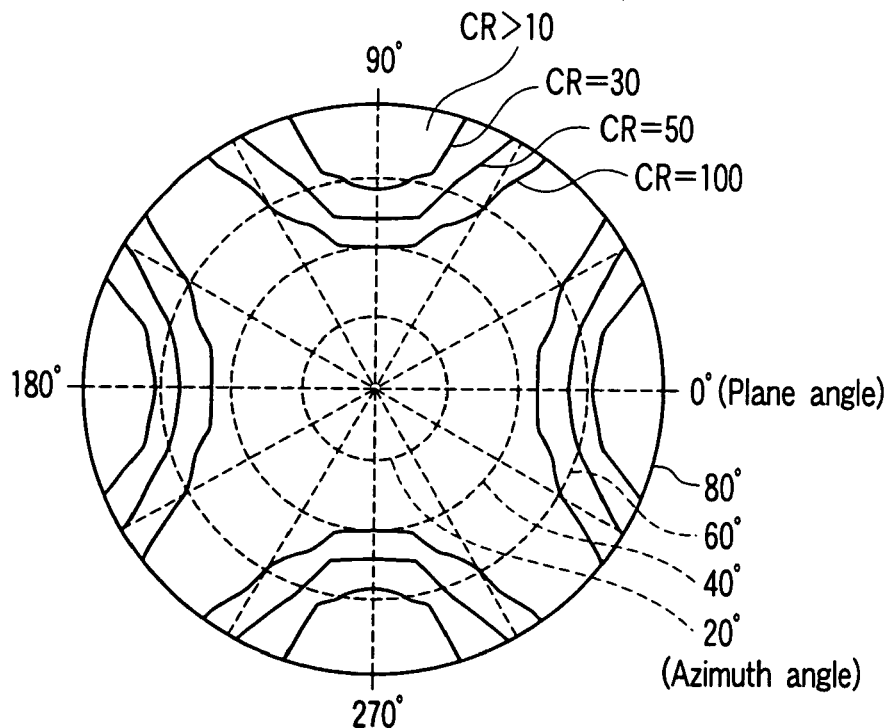
FIG. 23 is a graph showing the visual-angle-contrast characteristic of the liquid crystal display device actually measured when the pixel electrode shown in FIG. 17 is used.

FIG. 23 shows the visual-angle-contrast characteristic of the liquid crystal display device of this embodiment, actually measured. In this case, the liquid crystal display device is driven by a voltage of 4.7 V assigned to the (maximum) gradation for a white display. The visual-angle-contrast characteristic has contrast ratios (CR) of 10 or more in all directions. That is, it is apparent that an excellent viewing-angle property which is substantially the same as that in the conventional MVA mode liquid crystal display device shown in FIG. 30 is obtained. When the visual-angle-luminance characteristic is compared with the visual-angle-luminance characteristic shown in FIGS. 27 to 29 and obtained by the conventional MVA mode liquid crystal display device in which the number of divided domains is two, gradation inversion is canceled. The visual-angle-luminance characteristic is apparently improved in comparison with the visual-angle-luminance characteristic obtained by the conventional MVA mode liquid crystal display device and shown in FIGS. 24 to 26. Accordingly, the problem in which an image displayed in multicolor by the conventional MVA mode liquid crystal display device and observed in an inclined direction entirely looks white-brownish is solved.

Figure 31:
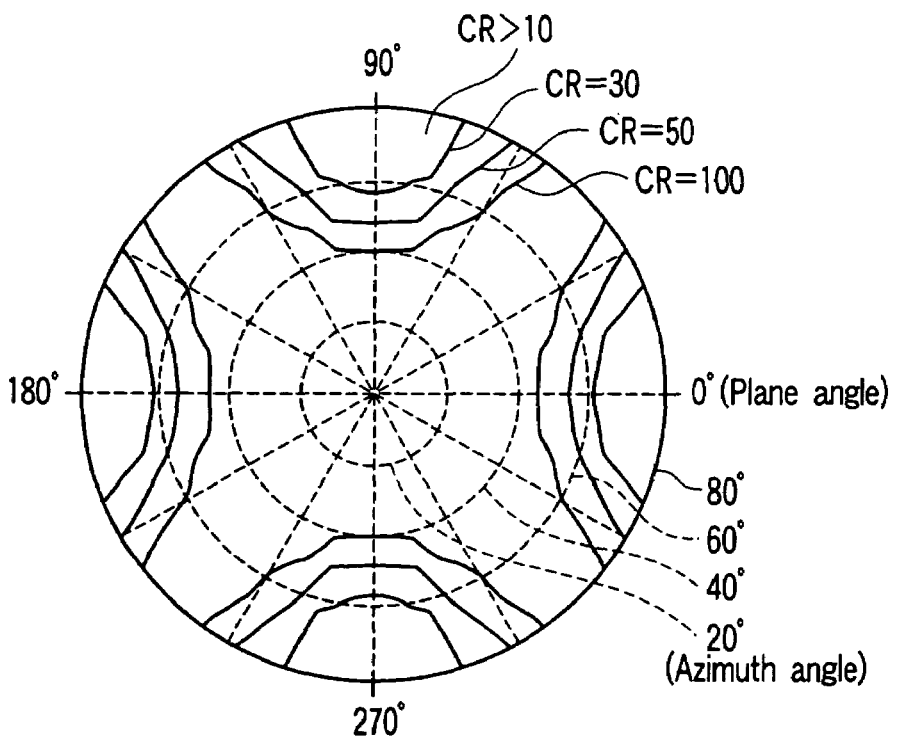
FIG. 31 is a graph showing the visual-angle-contrast characteristic of the MVA mode liquid crystal display device shown in FIG. 27, actually measured.

FIG. 23 shows the visual-angle-contrast characteristic of the liquid crystal display device. In this case, the liquid crystal display device is driven by a voltage of 4.7 V assigned to the (maximum) gradation for a white display. As a result, it is apparent that an excellent viewing-angle property which are the same as that in the conventional MVA mode liquid crystal display device shown in FIGS. 30 and 31 and the liquid crystal display device of the first embodiment shown in FIG. 16 can be realized.

In the liquid crystal display device of this embodiment, the number of divided domains is set at two. Therefore, when the embodiment is compared with the first embodiment, a substantial decrease in aperture ratio depending on the number of divided domains can be avoided. In the second embodiment, an absolute luminance which is equal to or larger than an absolute luminance obtained in the first embodiment can be obtained. In the prior art, when the number of divided domains is set at two, gradation inversion or the like occurs in an inclined direction. For this reason, the conventional liquid crystal display device is not suitable for applications of requiring an excellent viewing-angle property. However, the liquid crystal display device of this embodiment is suitable for the applications described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   a liquid crystal cell in which liquid crystal molecules are held between a pair of substrates that produce an electric field corresponding to a voltage applied thereto; and a pair of optical retardation plates arranged to hold said liquid crystal cell therebetween;

wherein each of said optical retardation plates includes first and second optical films stacked in a thickness direction to form an optical film stack, said first optical film includes a plurality of refractive elliptic bodies having optical axes which are tilted to have one component along the thickness direction and another component directed to a first predetermined side of the thickness direction of the optical film stack and whose tilt angles are set to have slight differences consecutively in the thickness direction, and said second optical film includes a plurality of refractive elliptic bodies having optical axes which are tilted to have one component along the thickness direction of the optical film stack and another component directed away from said first predetermined side and whose tilt angles are set to have slight differences consecutively in the thickness direction.

2. The liquid crystal display device according to claim 1, wherein said pair of optical retardation plates are in a crossed Nicol, and a thickness t of each optical retardation plate satisfies relational expressions given by 30 nm$\leqq$(nx−ny)t$\leqq$70 nm and 100 nm$\leqq$(nx−nz)t$\leqq$140 nm, where nx, ny, and nz are average refractive indices in and x-axis direction, a y-axis direction, and a z-axis direction, respectively.

3. The liquid crystal display device according to claim 1, wherein said liquid crystal cell is divided into two domains.

4. The liquid crystal display device according to claim 1, wherein said optical retardation plate includes a negative biaxial retardation plate.

5. The liquid crystal display device according to claim 4, wherein said biaxial retardation plate has in-plane retardation which compensates for visual angle dependence of a pair of polarizers that hold said retardation plate and liquid crystal cell therebetween.

6. The liquid crystal display device according to claim 5, wherein said liquid crystal cell is divided into domains in which alignment directions of the liquid crystal molecules make angles.

7. The liquid crystal display device according to claim 6, wherein said liquid crystal cell is divided into two domains.

8. The liquid crystal display device according to claim 6, wherein said liquid crystal cell is divided into four domains.

9. A liquid crystal display device comprising:

a liquid crystal cell in which liquid crystal molecules are held between a pair of substrates that produce an electric field corresponding to a voltage applied thereto, set in an alignment substantially vertical to each substrate plane when the voltage is not applied to said substrates, and set in an alignment that directors of said molecules are tilted in a predetermined cross section perpendicular to said substrate plane when the voltage is applied to said substrates; and a pair of optical retardation plates arranged to hold said liquid crystal cell therebetween;

wherein each of said optical retardation plates includes first and second optical films stacked in a thickness direction to form an optical film stack and to have negative retardation that presents an optical axis set in a direction substantially vertical to each substrate plane, said first optical film includes a plurality of refractive elliptic bodies having optical axes which are tilted on a same side as that of said liquid crystal molecules in said predetermined cross section, which are tilted to have one component along the thickness direction and another component directed to a first predetermined side of the thickness direction of the optical film stack, and whose tilt angles are set to have slight differences consecutively in the thickness direction, and said second optical film includes a plurality of refractive elliptic bodies having optical axes which are tilted on and opposite side as that of said liquid crystal molecules in said predetermined cross section, which are titled to have one component along the thickness direction of the optical film stack and another component directed away from said first predetermined side, and whose tilt angles are set to have slight differences consecutively in the thickness direction.

* * * * *